W. MORRISON.
Cultivator-Teeth.
No. { 1,073, 32,077. }
Patented Apr. 16, 1861.
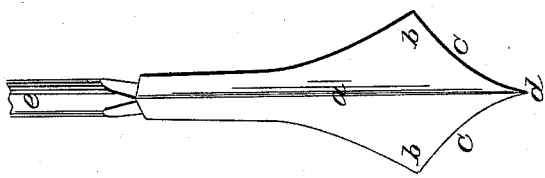
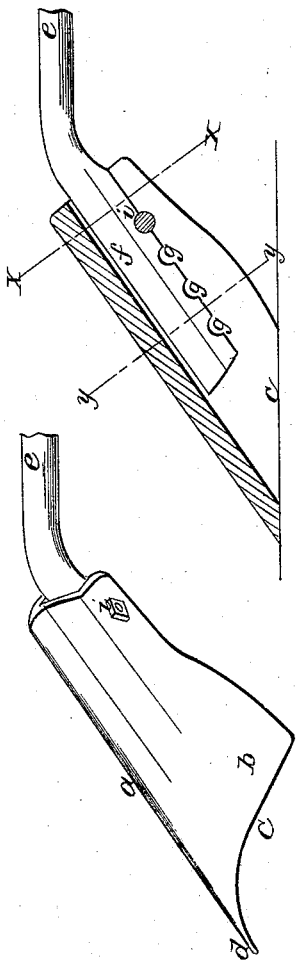
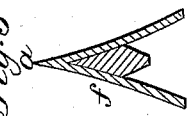
Witnesses:
Inventor:
William Morrison
By atty A B Stoughton

UNITED STATES PATENT OFFICE.

WILLIAM MORRISSON, OF CHADD'S FORD, PENNSYLVANIA.

IMPROVEMENT IN CULTIVATOR-TEETH.

Specification forming part of Letters Patent No. 32,077, dated April 16, 1861.

*To all whom it may concern:*

Be it known that I, WILLIAM MORRISSON, of Chadd's Ford, in the county of Delaware and State of Pennsylvania, have invented a new and useful Improvement in the Construction of Cultivator-Teeth; and I do hereby declare the following to be a full, clear, and exact description of the same, reference being had to the accompanying drawings, making a part of this specification, in which—

Figure 1 represents a side view of the tooth and shank. Fig. 2 represents a section through the comb of the tooth, leaving the shank in full or uncut. Fig. 3 represents a front view of the tooth and shank. Fig. 4 represents a cross-section through the tooth and shank at the line $x\ x$ of Fig. 2; and Fig. 5 represents a similar cross-section at the line $y\ y$ of said figure.

My invention consists in constructing a cultivator-tooth with a sharp edge in front and flaring wings, and bringing up the sides so as to form a diamond or arrow shaped opening toward and at the top, that will receive a similarly-shaped shank, to which it is fastened, as will be explained in connection with the drawings.

The cultivator-tooth is made of rolled, plate, or spring steel as follows: Two plates, of a kind of trapezoidal form, are cut out and their long sides welded together at an acute angle, as seen at $a$, and this line or edge is worked down to a sharp edge. The wings $b\ b$ are then bent outward and rounded up until the edges $c\ c$ have a regular bearing upon the ground, as shown in Fig. 2, leaving a sharp narrow point, $d$, in advance of the wings. At the line $y\ y$ of Fig. 2 the interior of the tooth has an angular opening like that seen in Fig. 5. Higher up at the line $x\ x$, and up to its top, the opening has a diamond or arrow shaped form, as seen in Fig. 4. That part of the shank $e$ above and beyond the tooth may be round, square, or flat; but the portion $f$ that enters the hollow of the tooth is of an arrow-shaped or diamond form, so as to fit nicely to the sides of the tooth; and a series of notches, $g\ g$, may be formed in the under edge of the shank, through which a bolt, key, or pin, $i$, that passes also through the sides of the tooth, may pass to hold the tooth and shank together or to adjust the former on the latter.

Having thus fully described the nature of my invention, what I claim therein as new, and desire to secure by Letters Patent, is—

A cultivator-tooth having a sharp front edge, flaring sides, and a diamond or arrow shaped opening at its top to receive a similarly-shaped shank, by which it is united to the cultivator-frame, substantially as herein described.

WILLIAM MORRISSON.

Witnesses:
 ROBT. FRAME,
 EMMOR C. JEFFERIS.